United States Patent
Lee et al.

(10) Patent No.: US 8,060,382 B1
(45) Date of Patent: Nov. 15, 2011

(54) METHOD AND SYSTEM FOR PROVIDING A HEALTHCARE BILL SETTLEMENT SYSTEM

(75) Inventors: Adam Cheung Lee, Burlingame, CA (US); Patricia Keaney, Greenbrae, CA (US); Richard Altinger, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 456 days.

(21) Appl. No.: 12/264,441

(22) Filed: Nov. 4, 2008

(51) Int. Cl.
*G06Q 50/00* (2006.01)
(52) U.S. Cl. ............... 705/3; 705/2; 705/4; 600/300
(58) Field of Classification Search .......... 705/2, 3, 705/4; 600/300
See application file for complete search history.

(56) References Cited

U.S. PATENT DOCUMENTS

| 7,970,626 | B2* | 6/2011 | Cracchiolo et al. | 705/2 |
| 2008/0033750 | A1* | 2/2008 | Burriss et al. | 705/2 |
| 2008/0103830 | A1* | 5/2008 | Apacible et al. | 705/3 |

* cited by examiner

*Primary Examiner* — Lena Najarian
(74) *Attorney, Agent, or Firm* — Gunnison, McKay & Hodgson, L.L.P.; Philip McKay

(57) ABSTRACT

A system and method for providing a healthcare bill settlement system whereby a given healthcare service consumer's EOB data relating to a given healthcare service item is obtained and is translated into a description of the services in language, and/or a format, that a typical healthcare service consumer can understand. The healthcare service consumer's EOB data is also used to present the healthcare service consumer with a payment calculation display and an explanation of how the healthcare service consumer's portion of the claim amount was calculated. The healthcare services consumer is then provided communication access to the healthcare services provider to propose a settlement payment prior to the healthcare services consumer receiving an invoice from the healthcare services provider. The healthcare services provider is then provided the capability to accept or reject the proposed settlement payment.

39 Claims, 2 Drawing Sheets

METHOD AND SYSTEM FOR PROVIDING A HEALTHCARE BILL SETTLEMENT SYSTEM

BACKGROUND

The costs associated with generating invoices and collecting payments for healthcare related services and products are among the highest of any industry. As an example, on average, the cost of invoicing and processing healthcare payments is typically 15% or more of the dollar amount spent on the healthcare services themselves. In contrast, the cost of invoicing and processing of payments in the retail industry is typically 2% or less.

The vast majority of these invoicing and processing costs in the healthcare industry are concentrated in the 250 billion dollars that healthcare service consumers pay healthcare service providers directly each year, i.e., the out-of-pocket costs the healthcare service consumers must pay beyond the portion that the healthcare insurance providers pay. However, despite the high cost of invoicing and processing healthcare payments, many healthcare service providers actually collect less than 50% of the payments invoiced to healthcare consumers for amounts not covered by healthcare insurance providers. As a result, the healthcare service providers not only incur the onerous invoicing and processing costs, but then, for their efforts, they still have one of the lowest actual collection rates of any industry.

The present situation is difficult enough for many healthcare service providers, however, the current annual out-of-pocket cost to healthcare service consumers of 250 billion dollars in the United States is expected to rise to 420 billion dollars within seven years. This is due, in part, to our aging population and, in part, to many healthcare service consumers being forced to accept healthcare insurance plans with higher co-payments, higher deductibles, and lower coverage ceilings/caps. As a result, many healthcare service providers fear the situation will become untenable as they spend more and more money, time, and resources processing and trying to collect healthcare service payments from healthcare service consumers, with fewer and fewer of those payments actually being collected.

In addition, for many healthcare service consumers understanding the processes, procedures, codes, calculations, and vocabulary associated with healthcare service claims is often difficult and confusing. As a result, in many instances, when the healthcare service consumer receives a bill from a healthcare service provider or an Explanation Of Benefits (EOB) from a healthcare insurance provider, the healthcare service consumer often has no idea how the amount billed was generated and/or determined, how their share of the cost was generated and/or determined, and/or how to proceed if they disagree with either of these amounts. To a large degree this is because the healthcare service bills and/or EOBs are often written in medical terms not discernible by the average healthcare service consumer and/or use codes that are typically completely unfamiliar to the average healthcare service consumer.

In addition, using current healthcare payment systems, any one of the three main parties involved in the payment process, i.e., the healthcare service consumer, the healthcare service provider, and the healthcare insurance provider, often have little or no visibility into the actions and/or data being used and/or generated by the other two parties and there is often no efficient mechanism in place to facilitate communication. This is particularly true for the average healthcare service consumer.

Further complicating the situation is the rather lengthy, and often seemingly redundant, chain of events associated with the processing of a healthcare claim, i.e., payment for a healthcare product and/or service made using, and/or through, a healthcare insurance provider. For instance, in a typical example, a healthcare service consumer covered by a healthcare insurance plan receives a product and/or service from a healthcare service provider on a Date-Of-Service (DOS). Under the terms of their healthcare insurance plan, the healthcare service consumer is often required to make a co-payment, often at the time the healthcare service consumer receives the product and/or service from the healthcare service provider. Typically, a receipt, or other document, is then generated for the co-payment and is typically provided to the healthcare service consumer.

After the healthcare service consumer receives the product and/or service from the healthcare service provider, the healthcare service provider then typically submits an original healthcare service provider claim for payment from the healthcare service consumer's healthcare insurance provider for the product and/or service provided. The healthcare insurance provider then typically reviews the submitted original healthcare service provider claim and, if the healthcare insurance provider has no issues with the submitted original healthcare service provider claim, the healthcare insurance provider pays the healthcare service provider according to the terms and conditions of the healthcare service consumer's healthcare insurance plan. In some cases, the payment made by the healthcare insurance provider according to the terms and conditions of the healthcare service consumer's healthcare insurance plan results in an actual payment made to the healthcare service provider by the healthcare insurance provider that is less than the full amount requested by the healthcare service provider in the original healthcare service provider claim. Herein, the actual payment made by the healthcare insurance provider is referred to as an adjusted healthcare claim payment, which represents payment of the submitted original healthcare service provider claim.

When the adjusted healthcare claim payment is received, the healthcare service provider may accept the adjusted healthcare claim payment, dispute the adjusted healthcare claim payment in whole, or in part, and/or invoice the healthcare service consumer for any difference between the original healthcare service provider claim amount and the adjusted healthcare claim payment, typically minus any co-payment amount already paid by the healthcare service consumer as discussed above.

To further complicate the situation, in conjunction with the adjusted healthcare claim payment, an explanation of benefits (EOB) statement is typically sent to the healthcare service consumer by the healthcare insurance provider. The EOB statement typically includes the notation "THIS IS NOT A BILL," prominently printed on each page of the EOB statement. The EOB statement typically does not inform the healthcare service consumer whether an issue exists regarding any difference between the original healthcare service provider claim amount and adjusted healthcare claim payment. As such, the healthcare service consumer may be given the false impression that the healthcare service provider has been paid in full for services rendered, and/or that no issues exist with respect to payment for the healthcare product and/or service. However, in the weeks, and even months, following receipt of the EOB statement, the healthcare service consumer may then receive a bill from the healthcare service provider for some, or all, of the remaining balance of the original healthcare service provider claim, which, herein, is referred to as a balance due by a healthcare service consumer.

Using current systems, a healthcare service consumer may wish to obtain more information, investigate, and/or resolve one or more disputes/inconsistencies between: the healthcare service consumer and the healthcare service provider: the healthcare service consumer and the healthcare insurance provider; and/or the healthcare service provider and the healthcare insurance provider. However, using current systems, any attempt to investigate and/or resolve one or more of these disputes/inconsistencies are typically complicated by the length of time that typically elapses between: the healthcare service consumer receiving the healthcare product and/ or service; the payment of any required co-payment by the healthcare service consumer; the submission of original healthcare service provider claim to the healthcare insurance provider; the review of the original healthcare service provider claim by the healthcare insurance provider; the adjusted healthcare claim payment made by the healthcare insurance provider to the healthcare service provider; the issuance and/ or receipt of the EOB; the healthcare service provider submitting an invoice to the healthcare service consumer; and any payments made by the healthcare service consumer to the healthcare service provider in response to an invoice. The situation is further complicated by apparent duplication of paperwork, often inconsistency of data, and lack of knowledge and/or accountability on the part of one or more of the involved parties as to where in the process an error has occurred, and which of the parties created the error.

Currently, the burden of resolving any of these disputes/ inconsistencies is largely left to the healthcare service consumer, who, currently, is the last party in the payment chain. The situation is, of course, particularly problematic when the healthcare service consumer is presented with a bill that is either not expected at all, or that is for an unexpected amount. In these instances, not only does the healthcare service consumer often fail to understand how the bill was generated, and/or why the bill is not for the amount expected, but, in many cases, the healthcare consumer has no idea what party to contact to discuss and/or challenge the bill, much less what department associated with a given party is needed.

For instance, when a bill is not understood and/or a perceived error is discovered, in many cases the healthcare service consumer does not know whether to contact the healthcare insurance provider, his or her healthcare service plan administrator, the healthcare service provider, the healthcare service consumer's employer, or even a collection agency that has contacted the healthcare consumer. For this reason alone, many healthcare service providers, healthcare insurance providers, employers, and/or healthcare service plan administrators lose precious time dealing with phone calls and letters from healthcare service consumers that have been incorrectly directed to their offices. This wasted time is in addition to the time wasted by the healthcare service consumers themselves attempting to determine who to contact, waiting on hold, navigating seemingly endless voicemail menus and automated responses, and then, often as not, being yet again redirected to a different contact to start the process over again.

In addition, even if the healthcare service consumer is able to contact a given party that may, or may not, be the right contact, they still often do not understand the information they have been provided from their bills and/or EOBs and often are unable to identify and/or provide the contacted party with the information regarding the bill that both they and the party will need to proceed. Indeed, the situation can be so confusing for some healthcare service consumers they do not even know how to describe their issues in a way that can allow any party to determine whether they are the proper contact or not.

As a result of the situation described above, not only are many healthcare service consumers currently forced to use their precious "free time" trying to deal with healthcare service disputes, and often only getting more frustration for their efforts, but, as noted, many healthcare service providers, healthcare insurance providers, employers, and/or plan administrators lose precious employee time dealing with phone calls and letters from healthcare service consumers who have incorrectly called their offices. In addition, as noted above, many healthcare service consumers are so confused and/or frustrated by the process, they simply refuse to pay the amount invoiced by the healthcare service provider. Consequently, the current situation is far from ideal for virtually all parties involved in the healthcare industry, and often results in frustrated and angry healthcare service consumers and healthcare service providers.

SUMMARY

In accordance with one embodiment, a system and method for providing a healthcare bill settlement system includes a process for providing a healthcare bill settlement system whereby data representing a healthcare service consumer's EOB data associated with a given healthcare service item is obtained by the process for providing a healthcare bill settlement system. In one embodiment, the healthcare service consumer's healthcare service consumer's EOB data is then translated by the process for providing a healthcare bill settlement system into an "intelligent EOB" that includes, in language, and/or a format, that a typical healthcare service consumer can understand, one or more of: a description of the services provided; a benefits description; and an explanation of how the healthcare service consumer's portion of the claim amount was calculated. In one embodiment, the process for providing a healthcare bill settlement system then enables the healthcare service consumer to communicate with the healthcare service provider, before the healthcare service provider generates an invoice, and to use the intelligent EOB data to determine their payment to the healthcare service provider and, in one embodiment, to make the payment electronically. In one embodiment, the process for providing a healthcare bill settlement system also enables both the healthcare service consumer and the healthcare service provider to communicate and resolve any payment issues, again before the healthcare service provider generates an invoice, and before the healthcare service provider expends any significant time processing the invoice.

In one embodiment, at least part of the data representing a healthcare service consumer's EOB data associated with a given healthcare service item is obtained by the process for providing a healthcare bill settlement system from, but not limited to, any one or more of the following sources: the healthcare service consumer's healthcare insurance provider; the healthcare service provider; the healthcare service consumer; a third party service; and/or any other party and/or parties having any part of the healthcare service consumer's EOB data.

In one embodiment, a given healthcare service consumer's EOB associated with a given healthcare service item includes, but is not limited to: healthcare claims data as submitted by one or more healthcare service providers to one or more healthcare insurance providers; dates of service; types of services rendered; healthcare service codes; claim amounts submitted by healthcare service providers; billing codes; healthcare insurance provider EOB codes; and/or healthcare insurance provider rules governing one or more healthcare insurance plans associated with the healthcare service consumer; and/or any other healthcare services data related to a given healthcare service item from one or more healthcare insurance providers, and/or one or more healthcare service plan administrators, and/or one or more healthcare service providers, and/or the healthcare service consumer, and/or one or more other parties such as, but not limited to, healthcare expense account program providers, healthcare expense account program administrators, and/or any other parties generating and/or having access to an individual's healthcare claims data.

In one embodiment, the given healthcare service consumer's EOB data is translated by the process for providing a healthcare bill settlement system into intelligent EOB data including language and/or a format that a typical healthcare service consumer can understand using one or more databases and/or lookup tables correlating healthcare service provider codes and/or healthcare insurance provider codes to types of healthcare services rendered.

In one embodiment, the given healthcare service consumer's EOB data is translated by the process for providing a healthcare bill settlement system into intelligent EOB data including language and/or a format that a typical healthcare service consumer can understand using one or more databases and/or lookup tables correlating medical terminology to layman language terms for types of healthcare services rendered.

In one embodiment, the given healthcare service consumer's EOB data is also used by the process for providing a healthcare bill settlement system to present the healthcare service consumer with a payment calculation display and an explanation of how the healthcare service consumer's portion of the claim amount was calculated. In one embodiment, the payment calculation display includes a display of the various costs involved and/or the calculus used by the healthcare insurance provider and/or healthcare service provider to determine the healthcare service consumer's bill. In one embodiment, the payment calculation display includes a spreadsheet type of display of healthcare insurance plan particulars such as, but not limited to: any payments already made; co-payments required; deductibles; allowed claim amounts; non-allowed claims amounts, and explanations as to why the amounts were not allowed; in-network and out-of-network services; and/or any adjustments made and an explanation of the adjustments.

In one embodiment, the healthcare service consumer is provided with this data along with an explanation of how the healthcare service consumer's portion of the claim amount was calculated in a broken down and more easily understood manner than is typically offered healthcare service provider bills and/or healthcare insurance provider's EOBs.

In one embodiment, the process for providing a healthcare bill settlement system enables the healthcare service consumer to view an estimated balance due by a healthcare service consumer calculated using the intelligent EOB data. In one embodiment, the process for providing a healthcare bill settlement system enables the healthcare service consumer to provide all, or part of the intelligent EOB, and/or the estimated balance due by a healthcare service consumer, to the healthcare service provider. In one embodiment, the process for providing a healthcare bill settlement system then enables the healthcare service consumer to make a settlement proposal to the healthcare service provider, again, in one embodiment, all before the healthcare service provider has processed any invoice or otherwise requested payment.

In one embodiment, if the healthcare service provider accepts the proposed settlement, the process for providing a healthcare bill settlement system automatically transfers the payment amount to the healthcare service provider, in one embodiment, via an electronic payment system.

In one embodiment, the process for providing a healthcare bill settlement system provides the healthcare service consumer with the ability to request more information from the healthcare service provider regarding a given healthcare service item. In one embodiment, the process for providing a healthcare bill settlement system provides the healthcare service consumer with the ability to request the healthcare service provider explain any adjudication and/or other adjustments made by the healthcare insurance provider. In one embodiment, the process for providing a healthcare bill settlement system provides the healthcare service consumer with the ability to request that the healthcare service provider dispute the any adjudication and/or other adjustments made by the healthcare insurance provider. Once again, in one embodiment, using the process for providing a healthcare bill settlement system this is accomplished before the healthcare service provider has processed any invoice, otherwise requested payment, or put significant resources into collecting payment from the healthcare consumer.

In one embodiment, if the healthcare service provider does not accept the healthcare consumers proposed settlement payment, the process for providing a healthcare bill settlement system enables the healthcare service provider to initiate a dispute communication/resolution process with the healthcare service consumer and/or the healthcare insurance provider.

In one embodiment, if the healthcare service provider does not accept the healthcare consumers proposed settlement payment and/or a dispute is not resolved, the process for providing a healthcare bill settlement system enables the healthcare service provider the capability to use the intelligent EOB data to generate an "intelligent invoice". In one embodiment, the intelligent invoice includes, but is not limited to, any one of the following: references and/or links to the intelligent EOB data; highlights showing where the healthcare service provider feels the healthcare service consumer's proposed settlement payment is not consistent with the intelligent EOB data; links and/or text showing communications between the healthcare service provider and one or more healthcare insurance providers; references or links to subsequently submitted claims and/or follow-on intelligent EOBs; references and/or links to data representing third party explanations and/or clarifications of treatment and/or healthcare billing issues.

Using the process for providing a healthcare bill settlement system, disclosed herein, healthcare service consumers are no longer burdened with waiting for both an EOB from a healthcare insurance provider to arrive and an invoice from the healthcare service provider to arrive and then comparing the two documents and/or trying to reconcile often conflicting data and/or statements. In addition, using the process for providing a healthcare bill settlement system, disclosed herein, the healthcare service providers also potentially receive faster payment, with less processing costs and do not have to waste resources taking phone calls from frustrated healthcare service consumers and trying to play the role of teacher and/or EOB code/language interpreter. In addition, using the process for providing a healthcare bill settlement system, disclosed herein, all data and/or communications between the three relevant parties, i.e., the healthcare service consumer, the healthcare service provider, and the healthcare insurance provider, can be collected in a single database and/or file and made available to all parties for both viewing and reference, in many cases, all before the healthcare service provider generates an invoice, and before the healthcare service provider expends any significant time processing the invoice. Consequently, using the process for providing a healthcare bill settlement system, disclosed herein, healthcare service consumers and healthcare service provider are both benefited by better, faster and more complete communication and dispute resolution.

Figure 1:
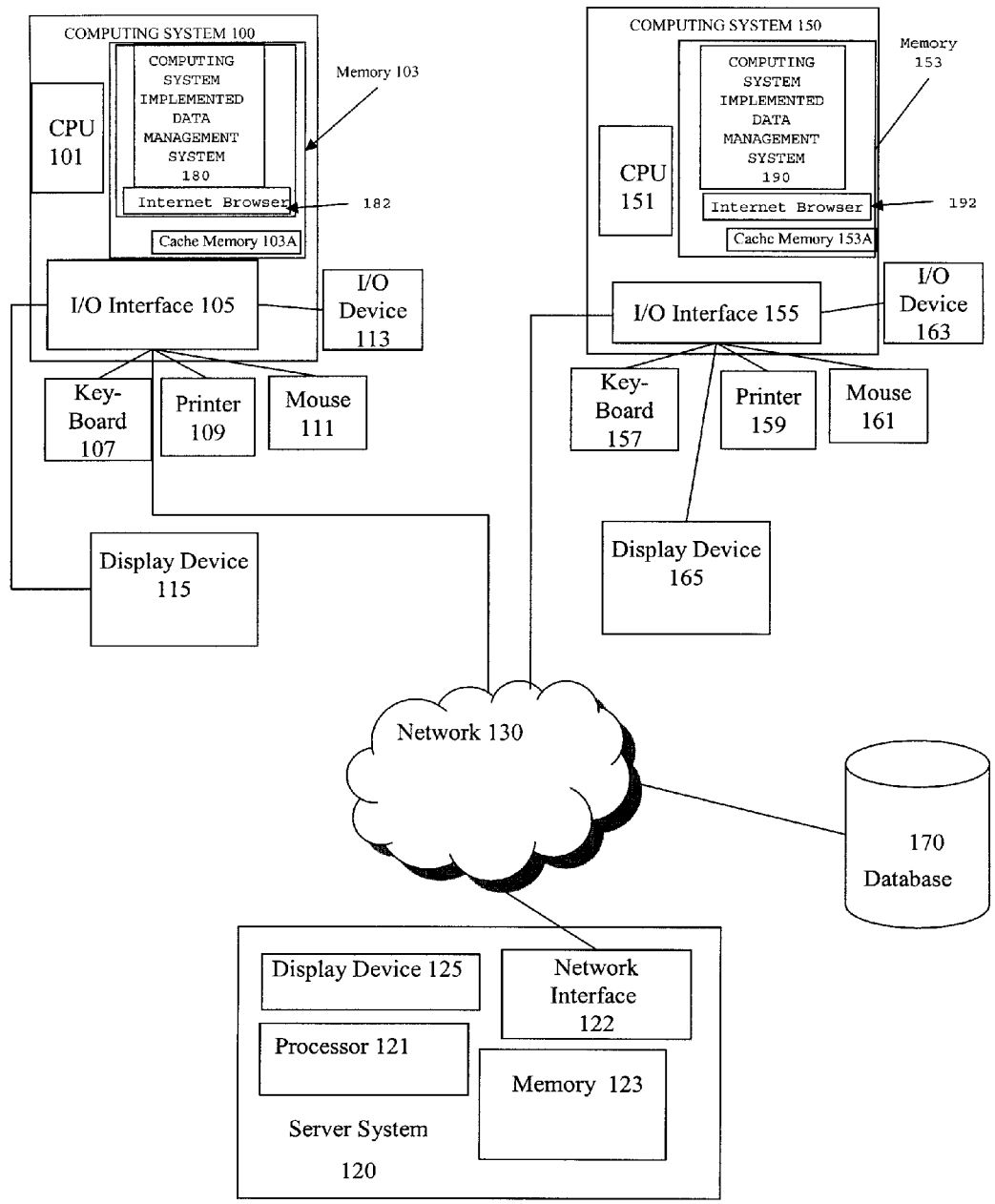
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for providing a healthcare bill settlement system includes a process for providing a healthcare bill settlement system whereby data representing a healthcare service consumer's EOB data associated with a given healthcare service item is obtained by the process for providing a healthcare bill settlement system. In one embodiment, the healthcare service consumer's healthcare service consumer's EOB data is then translated by the process for providing a healthcare bill settlement system into an "intelligent EOB" that includes, in language, and/or a format, that a typical healthcare service consumer can understand, one or more of: a description of the services provided; a benefits description; and an explanation of how the healthcare service consumer's portion of the claim amount was calculated. In one embodiment, the process for providing a healthcare bill settlement system then enables the healthcare service consumer to communicate with the healthcare service provider, before the healthcare service provider generates an invoice, and to use the intelligent EOB data to determine their payment to the healthcare service provider and, in one embodiment, to make the payment electronically. In one embodiment, the process for providing a healthcare bill settlement system also enables both the healthcare service consumer and the healthcare service provider to communicate and resolve any payment issues, again before the healthcare service provider generates an invoice, and before the healthcare service provider expends any significant time processing the invoice.

Hardware System Architecture

FIG. 1 is a block diagram of an exemplary hardware architecture for implementing one embodiment of a system and method for providing a healthcare bill settlement system, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented data management system 180, such as any computing system implemented data management system discussed herein, and/or known in the art at the time of filing, and/or as developed thereafter. In one embodiment, computing system implemented data management system 180 is a computing system implemented healthcare management system, as described herein, and/or known in the art at the time of filing, and/or as developed thereafter. In one embodiment, computing system implemented data management system 180 is stored, in whole, or in part, in memory system 103, and is used by, or includes, or is accessed by, a process for providing a healthcare bill settlement system.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. In one embodiment, a process for providing a healthcare bill settlement system and/or a computing system implemented data management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, EOB data representing and/or associated with one or more healthcare service items associated with one or more healthcare service consumers, in one or more formats, is stored, in whole, or in part, in memory system 103, and is used by, or is accessed by, a process for providing a healthcare bill settlement system and/or one or more consumers. In one embodiment, computing system 100 is a computing system accessible by one or more healthcare consumers and/or users. In one embodiment, computing system 100 is used, and/or accessible, by another computing system, such as computing system 150 (discussed below).

In one embodiment, computing system 100 is used, controlled, and/or accessible by, one or more healthcare service providers, and/or one or more healthcare insurance providers, and/or one or more healthcare consumers, and/or a provider of and/or a computing system implemented data management system, and EOB data representing and/or associated with one or more healthcare service items associated with one or more healthcare service consumers, is stored in computing system 100, typically in accounts associated with a given healthcare consumer.

Computing system 100 can be any computing system as defined herein and/or as known in the art at the time of filing and/or as developed thereafter, that includes components that can execute all, or part, of a process for providing a healthcare bill settlement system, and/or a computing system implemented data management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented data management system 190, such as any computing system implemented data management system defined herein, known in the art at the time of filing, and/or as developed thereafter. In one embodiment, computing system implemented data management system 190 is stored, in whole, or in part, in memory system 153, and is used by, or includes, or is accessed by, a process for providing a healthcare bill settlement system.

In one embodiment, data representing and/or associated with one or more healthcare service items associated with one or more healthcare service consumers, in one or more formats, is stored, in whole, or in part, in memory system 153, and is used by, or is accessed by, a process for providing a healthcare bill settlement system and/or one or more users. In one embodiment, computing system 150 is a computing system accessible by one or more computing system implemented healthcare management systems, one or more healthcare service providers, and/or one or more healthcare insurance providers, and/or one or more healthcare consumers, and/or a provider of and/or a computing system implemented data management system. In one embodiment, computing system 150 is used, and/or accessible, by another computing system, such as computing system 100.

Computing system 150 can be any computing system as defined herein and/or as known in the art at the time of filing and/or as developed thereafter, that includes components that can execute all, or part, of a process for providing a healthcare bill settlement system, and/or a computing system implemented data management system, in accordance with at least one of the embodiments as described herein.

As discussed in more detail below, in one embodiment, all, or part, of a process for providing a healthcare bill settlement system, and/or a computing system implemented data management system, and/or data representing and/or associated with one or more healthcare service items associated with one or more healthcare service consumers, can be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of a given consumer and/or user, and/or one or more agents for a given consumer and/or user, and/or a process for providing a healthcare bill settlement system, and/or one or more healthcare management systems and/or services, and/or a computing system implemented data management system.

In one embodiment, all, or part, of a process for providing a healthcare bill settlement system, and/or a computing system implemented data management system, and/or data representing and/or associated with one or more healthcare service items associated with one or more healthcare service consumers, is stored in database 170, and is used by, or is accessed by, a process for providing a healthcare bill settlement system. In one embodiment, database 170 is accessible by one or more healthcare service providers, and/or one or more healthcare insurance providers, and/or one or more healthcare consumers, and/or a provider of and/or a computing system implemented data management system. In one embodiment, database 170 is used, and/or accessible, by a computing system, such as computing systems 100 and/or 150, and/or a server system, such as sever system 120 (discussed below). In one embodiment, database 170 is used, controlled, and/or accessible by, a provider of and/or a computing system implemented healthcare management system.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, all, or part, of a process for providing a healthcare bill settlement system, and/or a computing system implemented data management system, and/or data representing and/or associated with one or more healthcare service items associated with one or more healthcare service consumers, is stored in server system 120, and is used by, or is accessed by, a process for providing a healthcare bill settlement system. In one embodiment, server system 120 is accessible by one or more healthcare service providers, and/or one or more healthcare insurance providers, and/or one or more healthcare consumers, and/or a provider of and/or a computing system implemented data management system. In one embodiment, server system 120 is used, and/or accessible, by a computing system, such as computing systems 100 and/or 150, and/or one or more databases, such as database 170.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, all, or part, of a process for providing a healthcare bill settlement system, and/or a computing system implemented data management system, and/or data representing and/or associated with one or more healthcare service items associated with one or more healthcare service consumers, is stored in memory system 103 and/or cache memory 103A, of computing system 100, and/or memory system 153 and/or cache memory 153A of computing system 150, and/or in server memory system 123 of server system 120, and/or in database 170, and executed on computing system 100 and/or computing system 150. As used herein, a memory refers to a volatile memory, a non-volatile memory, or any combination of the two.

Although a process for providing a healthcare bill settlement system, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing a healthcare bill settlement system and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, all, or part, of a process for providing a healthcare bill settlement system, and/or a computing system implemented data management system, and/or data representing and/or associated with one or more healthcare service items associated with one or more healthcare service consumers, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "healthcare services consumer", "healthcare service consumer", "healthcare consumer" and/or "consumer", are used interchangeably to denote any person, party, or parties, who provide their information to, or for whom information is gathered by, a process for providing a healthcare bill settlement system, or for whom interaction with a process for providing a healthcare bill settlement system is performed, and/or an authorized agent of any person, party, or parties, who provide their information to, or for whom information is gathered by, a process for providing a healthcare bill settlement system, or for whom interaction with a process for providing a healthcare bill settlement system is performed.

Herein, the term "healthcare service provider" and/or "healthcare services provider" denotes any individual person, persons, agencies, institutions, organizations, businesses, and/or other entities that provide medical treatment, medications, therapy, advice, and/or equipment. For example, herein, the term "healthcare service provider" includes, but is not limited to: doctors; nurses; technicians; therapists; pharmacists; laboratories; counselors; alternative medicine practitioners; medical facilities; doctor's offices; hospitals; emergency rooms; clinics; urgent care centers; alternative medicine clinics/facilities; physical therapy clinics/facilities; and any other entity providing general and/or specialized treatment, assessment, maintenance, therapy, medication, and/or advice relating to all, or any portion of, a healthcare service consumer's state of health, including but not limited to: general medical, specialized medical, surgical, dental, vision, psychological, and/or any other type of treatment, assessment, maintenance, therapy, medication, and/or advice.

Herein, the term "healthcare" includes any general and/or specialized treatment, assessment, maintenance, therapy, medication, and/or advice relating to all, or any portion of, a healthcare service consumer's state of health, including but not limited to: general medical, specialized medical, surgical, dental, vision, psychological, and/or any other type of treatment, assessment, maintenance, therapy, medication, and/or advice.

Herein, the term "medical treatment" includes, but is not limited to: one or more medications and/or medication regimes; physical therapy; recommended dietary changes; lab work, recommended activity level changes; other lifestyle changes; and/or surgical procedures; and/or any prescribed and/or suggested regime, medication, treatment, activity, avoided activity, and/or program designed to improve, maintain, and/or slow the degradation of, a healthcare consumer's state of health.

Herein, the terms "healthcare insurance plan", "healthcare benefit plan", and "health insurance program" are used interchangeably to denote any policy, program, means and/or mechanism whereby a healthcare consumer is provided healthcare benefits and/or healthcare services, and/or entitlements to any from of healthcare.

Herein, the terms "healthcare insurance provider", "healthcare insurance service provider", "healthcare insurance plan provider" and "health services insurance provider" are used interchangeably to denote any individual person, persons, agencies, institutions, organizations, businesses, and/or other entities that provide one or more healthcare insurance plans.

As used herein, the term "computing system", denotes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers;

PDAs; media players; server computers; or any desired combination of these devices, that are coupled to perform the processes and/or operations as described herein.

As used herein, the term "computing system implemented data management system" includes, but is not limited to: computing system implemented healthcare management systems, packages, programs, modules, or applications; computing system implemented personal and small business financial management systems, packages, programs, modules, or applications; computing system implemented business systems, packages, programs, modules, or applications; computing system implemented data management systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented accounting and/or invoicing systems, packages, programs, modules, or applications; computing system implemented business and/or point of sale systems, packages, programs, modules, or applications; and various other electronic data driven data management systems, packages, programs, modules, or applications, whether known at the time of filing or as developed later.

As used herein, the term "network" is used to denote any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, and/or known at the time of filing, and/or as developed thereafter.

In accordance with one embodiment, a system and method for providing a healthcare bill settlement system includes a process for providing a healthcare bill settlement system whereby data representing a healthcare service consumer's EOB data associated with a given healthcare service item is obtained by the process for providing a healthcare bill settlement system. In one embodiment, the healthcare service consumer's healthcare service consumer's EOB data is then translated by the process for providing a healthcare bill settlement system into an "intelligent EOB" that includes, in language, and/or a format, that a typical healthcare service consumer can understand, one or more of: a description of the services provided; a benefits description; and an explanation of how the healthcare service consumer's portion of the claim amount was calculated. In one embodiment, the process for providing a healthcare bill settlement system then enables the healthcare service consumer to communicate with the healthcare service provider, before the healthcare service provider generates an invoice, and to use the intelligent EOB data to determine their payment to the healthcare service provider and, in one embodiment, to make the payment electronically. In one embodiment, the process for providing a healthcare bill settlement system also enables both the healthcare service consumer and the healthcare service provider to communicate and resolve any payment issues, again before the healthcare service provider generates an invoice, and before the healthcare service provider expends any significant time processing the invoice.

Figure 2:
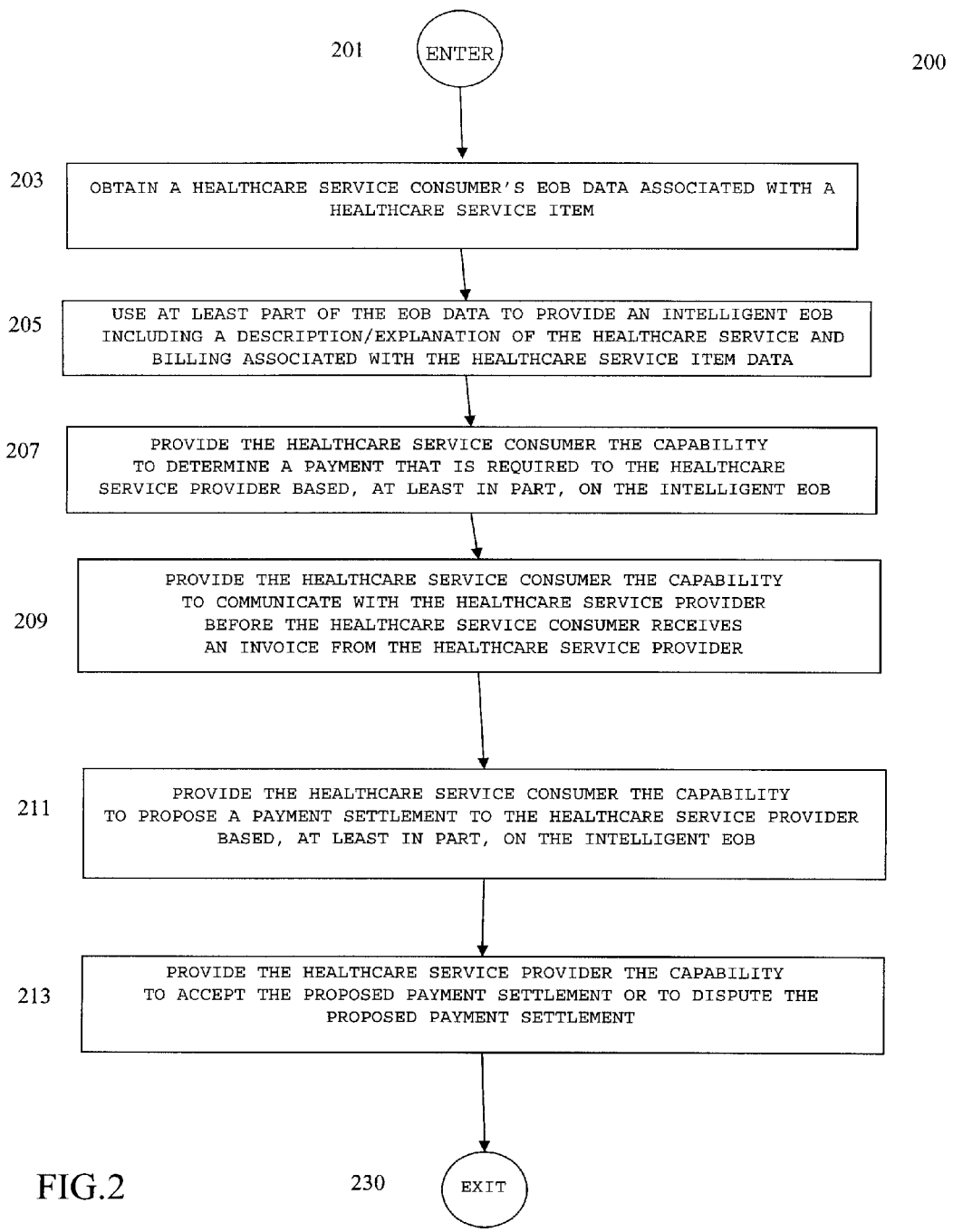
FIG. 2 is a flow chart depicting a process for providing a healthcare bill settlement system in accordance with one embodiment.

FIG. 2 a flow chart depicting a process for providing a healthcare bill settlement system 200 in accordance with one embodiment. Process for providing a healthcare bill settlement system 200 begins at ENTER OPERATION 201 of FIG. 2 and process flow proceeds to OBTAIN A HEALTHCARE SERVICE CONSUMER'S EOB DATA ASSOCIATED WITH A HEALTHCARE SERVICE ITEM OPERATION 203.

In one embodiment, at OBTAIN A HEALTHCARE SERVICE CONSUMER'S EOB DATA ASSOCIATED WITH A HEALTHCARE SERVICE ITEM OPERATION 203 a given healthcare service consumer's EOB data relating to a given healthcare service item is obtained by process for providing a healthcare bill settlement system 200.

In one embodiment, a healthcare service consumer, or other user, is provided access to process for providing a healthcare bill settlement system 200 through a website and/or a user interface display on a display screen, such as display devices 115, 165, 125 of FIG. 1 discussed below. Returning to FIG. 2, in one embodiment, process for providing a healthcare bill settlement system 200 is provided to a healthcare service consumer, or other user, through a parent computing system implemented data management system, such as computing system implemented data management systems 180 and/or 190 of FIG. 1. Returning to FIG. 2, in one embodiment, process for providing a healthcare bill settlement system 200 is provided to a healthcare service consumer, or other user, through a parent computing system implemented healthcare management system.

In one embodiment, process for providing a healthcare bill settlement system 200 is provided to a healthcare service consumer, or other user, as a stand alone application and/or system. In one embodiment, process for providing a healthcare bill settlement system 200 is provided to a healthcare service consumer, or other user, as an add-on module, application, and/or system. In one embodiment, process for providing a healthcare bill settlement system 200 is provided to a healthcare service consumer, or other user, through a network portal.

Herein EOB data includes not only data obtained direct or indirectly from an EOB, but also data from other sources that would normally be included in a typical EOB. In one embodiment, the given healthcare service consumer's EOB data related to a given healthcare service item is obtained at OBTAIN A HEALTHCARE SERVICE CONSUMER'S EOB DATA ASSOCIATED WITH A HEALTHCARE SERVICE ITEM OPERATION 203 includes, but is not limited to: healthcare claims data as submitted by one or more healthcare service providers to one or more healthcare insurance providers; EOB data directly obtained from one or more healthcare insurance providers; invoice data submitted to the healthcare service consumer by one or more healthcare service providers; and/or any other EOB data related to a given healthcare service item from one or more healthcare insurance providers, and/or one or more healthcare service plan administrators, and/or one or more healthcare service providers, and/or the healthcare service consumer, and/or one or more other parties such as, but not limited to, healthcare expense account program providers, healthcare expense account program administrators, and/or any other parties generating and/or having access to an individual's healthcare data.

In one embodiment, the given healthcare service consumer's EOB data includes, but is not limed to: names and contact information for specific healthcare service providers; dates of service; types of services rendered; healthcare service codes; claim amounts submitted by healthcare service providers; billing codes; healthcare insurance provider EOB codes; and/or healthcare insurance provider rules governing one or more healthcare insurance plans associated with the healthcare service consumer.

In one embodiment, the given healthcare service consumer's EOB data related to a given healthcare service item is obtained at OBTAIN A HEALTHCARE SERVICE CONSUMER'S EOB DATA ASSOCIATED WITH A HEALTHCARE SERVICE ITEM OPERATION 203 by linking to one or more databases, and/or computing systems, and/or websites associated with one or more healthcare insurance providers, and/or one or more healthcare service providers, and/or the healthcare service consumer.

In one embodiment, at OBTAIN A HEALTHCARE SERVICE CONSUMER'S EOB DATA ASSOCIATED WITH A HEALTHCARE SERVICE ITEM OPERATION 203, the given healthcare service consumer's EOB data related to a given healthcare service item is provided to process for providing a healthcare bill settlement system 200 either directly, or through a computing system implemented data management system that implements, includes, is accessible by, and/or is otherwise associated with, process for providing a healthcare bill settlement system 200.

In one embodiment, at OBTAIN A HEALTHCARE SERVICE CONSUMER'S EOB DATA ASSOCIATED WITH A HEALTHCARE SERVICE ITEM OPERATION 203, the given healthcare service consumer's EOB data related to a given healthcare service item is provided to process for providing a healthcare bill settlement system 200 from the healthcare service consumer via a user interface on a computing system display, such as computing system display device 115 of computing system 100 of FIG. 1, and a user interface device, such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

Returning to FIG. 2, in one embodiment, at OBTAIN A HEALTHCARE SERVICE CONSUMER'S EOB DATA ASSOCIATED WITH A HEALTHCARE SERVICE ITEM OPERATION 203, the given healthcare service consumer's EOB data related to a given healthcare service item is provided to process for providing a healthcare bill settlement system 200 by providing process for providing a healthcare bill settlement system 200, and/or a computing system implemented data management system associated with process for providing a healthcare bill settlement system 200, access to the data on a database, such as database 170 of FIG. 1, a computing system, such as computing systems 100 and/or 150 of FIG. 1, and/or a server system, such as server system 120 of FIG. 1, or a web-site or other web-based system, and/or using a computer program product as defined herein.

Returning to FIG. 2, in one embodiment, at OBTAIN A HEALTHCARE SERVICE CONSUMER'S EOB DATA ASSOCIATED WITH A HEALTHCARE SERVICE ITEM OPERATION 203, the given healthcare service consumer's EOB data related to a given healthcare service item is provided to process for providing a healthcare bill settlement system 200, and/or a computing system implemented data management system associated with process for providing a healthcare bill settlement system 200, through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1.

Returning to FIG. 2, in one embodiment, at OBTAIN A HEALTHCARE SERVICE CONSUMER'S EOB DATA ASSOCIATED WITH A HEALTHCARE SERVICE ITEM OPERATION 203, the given healthcare service consumer's EOB data related to a given healthcare service item is provided to process for providing a healthcare bill settlement system 200, and/or a computing system implemented data management system associated with process for providing a healthcare bill settlement system 200, through e-mail and/or through text messaging.

In one embodiment, at OBTAIN A HEALTHCARE SERVICE CONSUMER'S EOB DATA ASSOCIATED WITH A HEALTHCARE SERVICE ITEM OPERATION 203, the given healthcare service consumer's EOB data related to a given healthcare service item is provided to process for providing a healthcare bill settlement system 200, and/or a computing system implemented data management system associated with process for providing a healthcare bill settlement system 200, using screen scraping, or a similar technology, as known in the art at the time of filing, and/or as developed after the time of filing.

In one embodiment, at OBTAIN A HEALTHCARE SERVICE CONSUMER'S EOB DATA ASSOCIATED WITH A HEALTHCARE SERVICE ITEM OPERATION 203, the given healthcare service consumer's EOB data related to a given healthcare service item is provided to process for providing a healthcare bill settlement system 200, and/or a computing system implemented data management system associated with process for providing a healthcare bill settlement system 200, using any method, apparatus, process or mechanism for transferring data, images, screen displays, and/or text from one or more devices, computing systems, server systems, databases, web site/web functions and/or any devices to one or more other devices, computing systems, server systems, databases, web site/web functions and/or any devices having a data storage and/or display capability, whether known at the time of filing or as thereafter developed.

Methods, means, and mechanisms for providing, entering, transferring, downloading, and/or otherwise obtaining data are well known to those of skill in the art. Consequently a more detailed discussion of the methods, means, and mechanisms for providing, entering, transferring, downloading, and/or otherwise obtaining data are omitted here to avoid detracting from the invention.

In one embodiment, once the given healthcare service consumer's EOB data related to a given healthcare service item is obtained by process for providing a healthcare bill settlement system 200 at OBTAIN A HEALTHCARE SERVICE CONSUMER'S EOB DATA ASSOCIATED WITH A HEALTHCARE SERVICE ITEM OPERATION 203, the data is stored, in whole, or in part, in a database maintained by, accessible by, owned by, or otherwise related to: process for providing a healthcare bill settlement system 200, and/or a provider of process for providing a healthcare bill settlement system 200; a computing system implemented data management system, and/or a provider of a computing system implemented data management system; a computing system implemented healthcare management system, and/or a provider of a computing system implemented healthcare management system; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

In one embodiment, once the given healthcare service consumer's EOB data related to a given healthcare service item is obtained by process for providing a healthcare bill settlement system 200 at OBTAIN A HEALTHCARE SERVICE CONSUMER'S EOB DATA ASSOCIATED WITH A HEALTHCARE SERVICE ITEM OPERATION 203, and, in one embodiment is stored, process flow proceeds to USE AT LEAST PART OF THE EOB DATA TO PROVIDE AN INTELLIGENT EOB INCLUDING A DESCRIPTION/EXPLANATION OF THE HEALTHCARE SERVICE AND BILLING ASSOCIATED WITH THE HEALTHCARE SERVICE ITEM DATA OPERATION 205.

In one embodiment, at USE AT LEAST PART OF THE EOB DATA TO PROVIDE AN INTELLIGENT EOB INCLUDING A DESCRIPTION/EXPLANATION OF THE HEALTHCARE SERVICE AND BILLING ASSOCIATED WITH THE HEALTHCARE SERVICE ITEM DATA OPERATION 205 at least part of the healthcare service consumer's EOB data obtained at OBTAIN A HEALTHCARE SERVICE CONSUMER'S EOB DATA ASSOCIATED WITH A HEALTHCARE SERVICE ITEM OPERATION 203 is translated by process for providing a healthcare bill settlement system 200 into an "intelligent EOB" that includes one or more of: a description of the services provided; a benefits description; and an explanation of how the healthcare service consumer's portion of the claim amount was calculated. In one embodiment, the intelligent EOB includes a description of the services that is provided to the user in language, and/or a format, that a typical healthcare service consumer can understand, i.e., the data is translated into "layman terms" or "plain language".

In one embodiment, at USE AT LEAST PART OF THE EOB DATA TO PROVIDE AN INTELLIGENT EOB INCLUDING A DESCRIPTION/EXPLANATION OF THE HEALTHCARE SERVICE AND BILLING ASSOCIATED WITH THE HEALTHCARE SERVICE ITEM DATA OPERATION 205 at least part of the healthcare service consumer's EOB data obtained at OBTAIN A HEALTHCARE SERVICE CONSUMER'S EOB DATA ASSOCIATED WITH A HEALTHCARE SERVICE ITEM OPERATION 203 is translated by process for providing a healthcare bill settlement system 200 into an intelligent EOB including language and/or a format that a typical healthcare service consumer can understand using one or more databases, such as database 170 of FIG. 1, and/or lookup tables.

Returning to FIG. 2, in one embodiment, at USE AT LEAST PART OF THE EOB DATA TO PROVIDE AN INTELLIGENT EOB INCLUDING A DESCRIPTION/EXPLANATION OF THE HEALTHCARE SERVICE AND BILLING ASSOCIATED WITH THE HEALTHCARE SERVICE ITEM DATA OPERATION 205 at least part of the healthcare service consumer's EOB data obtained at OBTAIN A HEALTHCARE SERVICE CONSUMER'S EOB DATA ASSOCIATED WITH A HEALTHCARE SERVICE ITEM OPERATION 203 is translated by process for providing a healthcare bill settlement system 200 into an intelligent EOB that includes language and/or a format that a typical healthcare service consumer can understand using one or more databases and/or lookup tables correlating healthcare service provider and/or medical terminology and/or healthcare insurance provider vocabulary to "plain language" explanations of the types of healthcare services rendered.

In one embodiment, at USE AT LEAST PART OF THE EOB DATA TO PROVIDE AN INTELLIGENT EOB INCLUDING A DESCRIPTION/EXPLANATION OF THE HEALTHCARE SERVICE AND BILLING ASSOCIATED WITH THE HEALTHCARE SERVICE ITEM DATA OPERATION 205 at least part of the healthcare service consumer's EOB data obtained at OBTAIN A HEALTHCARE SERVICE CONSUMER'S EOB DATA ASSOCIATED WITH A HEALTHCARE SERVICE ITEM OPERATION 203 is translated by process for providing a healthcare bill settlement system 200 into an intelligent EOB that includes language and/or a format that a typical healthcare service consumer can understand using one or more databases and/or lookup tables correlating healthcare service provider codes and/or healthcare insurance provider codes to "plain language" explanations of the types of healthcare services rendered.

In one embodiment, at USE AT LEAST PART OF THE EOB DATA TO PROVIDE AN INTELLIGENT EOB INCLUDING A DESCRIPTION/EXPLANATION OF THE HEALTHCARE SERVICE AND BILLING ASSOCIATED WITH THE HEALTHCARE SERVICE ITEM DATA OPERATION 205 at least part of the given healthcare service consumer's EOB data of OBTAIN A HEALTHCARE SERVICE CONSUMER'S EOB DATA ASSOCIATED WITH A HEALTHCARE SERVICE ITEM OPERATION 203 is used by process for providing a healthcare bill settlement system 200 to present the healthcare service consumer with an intelligent EOB that includes a payment calculation display and/or an explanation of how the healthcare service consumer's portion of the claim amount was calculated.

In one embodiment, at USE AT LEAST PART OF THE EOB DATA TO PROVIDE AN INTELLIGENT EOB INCLUDING A DESCRIPTION/EXPLANATION OF THE HEALTHCARE SERVICE AND BILLING ASSOCIATED WITH THE HEALTHCARE SERVICE ITEM DATA OPERATION 205 at least part of the given healthcare service consumer's EOB data of OBTAIN A HEALTHCARE SERVICE CONSUMER'S EOB DATA ASSOCIATED WITH A HEALTHCARE SERVICE ITEM OPERATION 203 is used by process for providing a healthcare bill settlement system to generate an intelligent EOB that includes a payment calculation display that includes a display of the various costs involved and/or the calculus used by the healthcare insurance provider and/or healthcare service provider to determine the healthcare service consumer's bill. In one embodiment, the payment calculation display includes a spreadsheet type of display of healthcare insurance plan particulars such as, but not limited to: any payments already made; co-payments required; deductibles; allowed claim amounts; non-allowed claims amounts, and explanations as to why the amounts were not allowed; in-network and out-of-network services; and/or any adjustments made and an explanation of the adjustments. In one embodiment, the healthcare service consumer is provided with an intelligent EOB that includes this data along with an explanation of how the healthcare service consumer's portion of the claim amount was calculated in a broken down and more easily understood manner than is typically offered through healthcare service provider bills and/or healthcare insurance provider's EOBs.

In one embodiment, once at least part of the given healthcare service consumer's EOB data of OBTAIN A HEALTHCARE SERVICE CONSUMER'S EOB DATA ASSOCIATED WITH A HEALTHCARE SERVICE ITEM OPERATION 203 is used by process for providing a healthcare bill settlement system 200 to present the healthcare service consumer with an intelligent EOB at USE AT LEAST PART OF THE EOB DATA TO PROVIDE AN INTELLIGENT EOB INCLUDING A DESCRIPTION/EXPLANATION OF THE HEALTHCARE SERVICE AND BILLING ASSOCIATED WITH THE HEALTHCARE SERVICE ITEM DATA OPERATION 205, process flow proceeds to PROVIDE THE HEALTHCARE SERVICE CONSUMER THE CAPABILITY TO DETERMINE A PAYMENT THAT IS REQUIRED TO THE HEALTHCARE SERVICE PROVIDER BASED, AT LEAST IN PART, ON THE INTELLIGENT EOB OPERATION 207.

In one embodiment, at PROVIDE THE HEALTHCARE SERVICE CONSUMER THE CAPABILITY TO DETERMINE A PAYMENT THAT IS REQUIRED TO THE HEALTHCARE SERVICE PROVIDER BASED, AT LEAST IN PART, ON THE INTELLIGENT EOB OPERATION 207 process for providing a healthcare bill settlement system 200 provides the healthcare care consumer the ability to use the intelligent EOB data of USE AT LEAST PART OF THE EOB DATA TO PROVIDE AN INTELLIGENT EOB INCLUDING A DESCRIPTION/EXPLANATION OF THE HEALTHCARE SERVICE AND BILLING ASSOCIATED WITH THE HEALTHCARE SERVICE ITEM DATA OPERATION 205 to determine their required payment to the healthcare service provider.

In one embodiment, at PROVIDE THE HEALTHCARE SERVICE CONSUMER THE CAPABILITY TO DETERMINE A PAYMENT THAT IS REQUIRED TO THE HEALTHCARE SERVICE PROVIDER BASED, AT LEAST IN PART, ON THE INTELLIGENT EOB OPERATION 207 process for providing a healthcare bill settlement system 200 calculates the estimated balance due by a healthcare service consumer using the intelligent EOB data of USE AT LEAST PART OF THE EOB DATA TO PROVIDE AN INTELLIGENT EOB INCLUDING A DESCRIPTION/EXPLANATION OF THE HEALTHCARE SERVICE AND BILLING ASSOCIATED WITH THE HEALTHCARE SERVICE ITEM DATA OPERATION 205 and shows the healthcare service consumer how the estimated balance due by a healthcare service consumer was determined in "plain language" and/or in a payment calculation display.

In one embodiment, at PROVIDE THE HEALTHCARE SERVICE CONSUMER THE CAPABILITY TO DETERMINE A PAYMENT THAT IS REQUIRED TO THE HEALTHCARE SERVICE PROVIDER BASED, AT LEAST IN PART, ON THE INTELLIGENT EOB OPERATION 207 process for providing a healthcare bill settlement system 200 provides the estimated balance due by a healthcare service consumer to the healthcare consumer before the healthcare service provider has processed any invoice, or at least completely processed any invoice, or otherwise requested payment and/or before the healthcare consumer has received an invoice from the healthcare consumer.

In one embodiment, once process for providing a healthcare bill settlement system 200 provides the healthcare care consumer the ability to use the intelligent EOB data of USE AT LEAST PART OF THE EOB DATA TO PROVIDE AN INTELLIGENT EOB INCLUDING A DESCRIPTION/EXPLANATION OF THE HEALTHCARE SERVICE AND BILLING ASSOCIATED WITH THE HEALTHCARE SERVICE ITEM DATA OPERATION 205 to determine their required payment to the healthcare service provider at PROVIDE THE HEALTHCARE SERVICE CONSUMER THE CAPABILITY TO DETERMINE A PAYMENT THAT IS REQUIRED TO THE HEALTHCARE SERVICE PROVIDER BASED, AT LEAST IN PART, ON THE INTELLIGENT EOB OPERATION 207, process flow proceeds to PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209.

In one embodiment, at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209 the healthcare service consumer is provided a mechanism to communicate with the healthcare service provider, before the healthcare service provider generates an invoice, and, in one embodiment, to make a payment electronically.

In one embodiment, at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209 the healthcare service consumer is provided a mechanism to communicate with the healthcare service provider by linking to one or more databases, and/or computing systems, and/or websites associated with process for providing a healthcare bill settlement system 200 and/or one or more computing system implemented data management systems associated with process for providing a healthcare bill settlement system 200, and/or one or more healthcare service providers, and/or the healthcare service consumer.

In one embodiment, at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209, the healthcare service consumer is provided a mechanism to communicate with the healthcare service provider either directly, or through a computing system implemented data management system that implements, includes, is accessible by, and/or is otherwise associated with, process for providing a healthcare bill settlement system 200.

In one embodiment, at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209, the healthcare service consumer is provided a mechanism to communicate with the healthcare service provider via a user interface on a computing system display, such as computing system display device 115 of computing system 100 of FIG.

1, and a user interface device, such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

Returning to FIG. 2, in one embodiment, at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209, the healthcare service consumer is provided a mechanism to communicate with the healthcare service provider by providing process for providing a healthcare bill settlement system 200, and/or a computing system implemented data management system associated with process for providing a healthcare bill settlement system 200, access to the data on a database, such as database 170 of FIG. 1, a computing system, such as computing systems 100 and/or 150 of FIG. 1, and/or a server system, such as server system 120 of FIG. 1, or a web-site or other web-based system, and/or using a computer program product as defined herein.

Returning to FIG. 2, in one embodiment, at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209, the healthcare service consumer is provided a mechanism to communicate with the healthcare service provider through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1.

Returning to FIG. 2, in one embodiment, at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209, the healthcare service consumer is provided a mechanism to communicate with the healthcare service provider through e-mail and/or through text messaging.

In one embodiment, at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209 the healthcare service consumer is provided a mechanism to communicate with the healthcare service provider using any method, apparatus, process or mechanism for establishing electronic communications and/or transferring data, images, screen displays, and/or text from one or more devices, computing systems, server systems, databases, web site/web functions and/or any devices to one or more other devices, computing systems, server systems, databases, web site/web functions and/or any devices having a data storage and/or display capability, whether known at the time of filing or as thereafter developed.

In one embodiment, at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209 the healthcare service consumer uses the provided mechanism to communicate with the healthcare service provider to provide all, or part of, the intelligent EOB, and/or the estimated balance due by a healthcare service consumer, to the healthcare service provider.

In one embodiment, at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209 the healthcare service consumer uses the provided mechanism to communicate with the healthcare service provider to request more information from the healthcare service provider regarding a given healthcare service item and/or other intelligent EOB data.

In one embodiment, at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209 the healthcare service consumer uses the provided mechanism to communicate with the healthcare service provider to request the healthcare service provider explain any adjudication and/or other adjustments made by the healthcare insurance provider as shown in the intelligent EOB data.

In one embodiment, at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209 the healthcare service consumer uses the provided mechanism to communicate with the healthcare service provider to request that the healthcare service provider dispute the any adjudication and/or other adjustments made by the healthcare insurance provider as shown in the intelligent EOB data.

Once again, in one embodiment, using process for providing a healthcare bill settlement system 200 this communication is accomplished before the healthcare service provider has completely processed an invoice, otherwise requested payment, or put significant resources into collecting payment from the healthcare consumer.

In one embodiment, once the healthcare service consumer is provided a mechanism to communicate with the healthcare service provider, before the healthcare service provider generates an invoice at PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209, process flow proceeds to PROVIDE THE HEALTHCARE SERVICE CONSUMER THE CAPABILITY TO PROPOSE A PAYMENT SETTLEMENT TO THE HEALTHCARE SERVICE PROVIDER BASED, AT LEAST IN PART, ON THE INTELLIGENT EOB OPERATION 211.

In one embodiment, at PROVIDE THE HEALTHCARE SERVICE CONSUMER THE CAPABILITY TO PROPOSE A PAYMENT SETTLEMENT TO THE HEALTHCARE SERVICE PROVIDER BASED, AT LEAST IN PART, ON THE INTELLIGENT EOB OPERATION 211 process for providing a healthcare bill settlement system 200 enables the healthcare service consumer to make a settlement proposal to the healthcare service provider, again, in one embodiment, before the healthcare service provider has processed an invoice or otherwise requested payment from the healthcare consumer.

In one embodiment, at PROVIDE THE HEALTHCARE SERVICE CONSUMER THE CAPABILITY TO PROPOSE A PAYMENT SETTLEMENT TO THE HEALTHCARE SERVICE PROVIDER BASED, AT LEAST IN PART, ON THE INTELLIGENT EOB OPERATION 211 the healthcare consumer makes a settlement proposal to the healthcare service provider before the healthcare service provider has processed an invoice based, at least in part, on the intelligent EOB data, and/or the estimated balance due by a healthcare service consumer, as, in one embodiment, sent to the healthcare service provider by the healthcare service consumer.

In one embodiment, at PROVIDE THE HEALTHCARE SERVICE CONSUMER THE CAPABILITY TO PROPOSE A PAYMENT SETTLEMENT TO THE HEALTHCARE SERVICE PROVIDER BASED, AT LEAST IN PART, ON THE INTELLIGENT EOB OPERATION 211 the healthcare consumer makes a settlement proposal to the healthcare service provider that is the entire amount of the estimated balance due by a healthcare service consumer of PROVIDE THE HEALTHCARE SERVICE CONSUMER THE CAPABILITY TO DETERMINE A PAYMENT THAT IS REQUIRED TO THE HEALTHCARE SERVICE PROVIDER BASED, AT LEAST IN PART, ON THE INTELLIGENT EOB OPERATION 207. In other embodiments, at PROVIDE THE HEALTHCARE SERVICE CONSUMER THE CAPABILITY TO PROPOSE A PAYMENT SETTLEMENT TO THE HEALTHCARE SERVICE PROVIDER BASED, AT LEAST IN PART, ON THE INTELLIGENT EOB OPERATION 211 the healthcare consumer makes a settlement proposal to the healthcare service provider that is other than the entire amount of the estimated balance due by a healthcare service consumer of PROVIDE THE HEALTHCARE SERVICE CONSUMER THE CAPABILITY TO DETERMINE A PAYMENT THAT IS REQUIRED TO THE HEALTHCARE SERVICE PROVIDER BASED, AT LEAST IN PART, ON THE INTELLIGENT EOB OPERATION 207.

In one embodiment, once process for providing a healthcare bill settlement system 200 enables the healthcare service consumer to make a settlement proposal to the healthcare service provider, in one embodiment, before the healthcare service provider has processed an invoice or otherwise requested payment from the healthcare consumer at PROVIDE THE HEALTHCARE SERVICE CONSUMER THE CAPABILITY TO PROPOSE A PAYMENT SETTLEMENT TO THE HEALTHCARE SERVICE PROVIDER BASED, AT LEAST IN PART, ON THE INTELLIGENT EOB OPERATION 211, process flow proceeds to PROVIDE THE HEALTHCARE SERVICE PROVIDER THE CAPABILITY TO ACCEPT THE PROPOSED PAYMENT SETTLEMENT OR TO DISPUTE THE PROPOSED PAYMENT SETTLEMENT OPERATION 213.

In one embodiment, at PROVIDE THE HEALTHCARE SERVICE PROVIDER THE CAPABILITY TO ACCEPT THE PROPOSED PAYMENT SETTLEMENT OR TO DISPUTE THE PROPOSED PAYMENT SETTLEMENT OPERATION 213, once process for providing a healthcare bill settlement system 200 enables the healthcare service consumer to make a settlement proposal to the healthcare service provider at PROVIDE THE HEALTHCARE SERVICE CONSUMER THE CAPABILITY TO PROPOSE A PAYMENT SETTLEMENT TO THE HEALTHCARE SERVICE PROVIDER BASED, AT LEAST IN PART, ON THE INTELLIGENT EOB OPERATION 211 the healthcare service provider may accept or decline the proposed settlement.

In one embodiment, if at PROVIDE THE HEALTHCARE SERVICE PROVIDER THE CAPABILITY TO ACCEPT THE PROPOSED PAYMENT SETTLEMENT OR TO DISPUTE THE PROPOSED PAYMENT SETTLEMENT OPERATION 213 the healthcare service provider accepts the proposed settlement of PROVIDE THE HEALTHCARE SERVICE CONSUMER THE CAPABILITY TO PROPOSE A PAYMENT SETTLEMENT TO THE HEALTHCARE SERVICE PROVIDER BASED, AT LEAST IN PART, ON THE INTELLIGENT EOB OPERATION 211 process for providing a healthcare bill settlement system automatically transfers the payment amount to the healthcare service provider, in one embodiment, via an electronic payment system.

In one embodiment, if at PROVIDE THE HEALTHCARE SERVICE PROVIDER THE CAPABILITY TO ACCEPT THE PROPOSED PAYMENT SETTLEMENT OR TO DISPUTE THE PROPOSED PAYMENT SETTLEMENT OPERATION 213 the healthcare service provider does not accept the proposed settlement of PROVIDE THE HEALTHCARE SERVICE CONSUMER THE CAPABILITY TO PROPOSE A PAYMENT SETTLEMENT TO THE HEALTHCARE SERVICE PROVIDER BASED, AT LEAST IN PART, ON THE INTELLIGENT EOB OPERATION 211 then, the healthcare service provider has several options through process for providing a healthcare bill settlement system 200.

In one embodiment, at PROVIDE THE HEALTHCARE SERVICE PROVIDER THE CAPABILITY TO ACCEPT THE PROPOSED PAYMENT SETTLEMENT OR TO DISPUTE THE PROPOSED PAYMENT SETTLEMENT OPERATION 213 if the healthcare service provider does not accept the healthcare consumers proposed settlement payment, process for providing a healthcare bill settlement system 200 enables the healthcare service provider to communicate with the healthcare service consumer and/or the healthcare insurance provider and/or to reference the intelligent EOB data.

In one embodiment, these communications are made any method, apparatus, process or mechanism for establishing electronic communications and/or transferring data, images, screen displays, and/or text from one or more devices, computing systems, server systems, databases, web site/web functions and/or any devices to one or more other devices, computing systems, server systems, databases, web site/web functions and/or any devices having a data storage and/or display capability, as discussed herein, and/or known at the time of filing, and/or as thereafter developed, including, in one embodiment, the mechanism to communicate with the healthcare service provider of PROVIDE THE HEALTHCARE SERVICE CONSUMER THE CAPABILITY TO COMMUNICATE WITH THE HEALTHCARE SERVICE PROVIDER BEFORE THE HEALTHCARE SERVICE CONSUMER RECEIVES AN INVOICE FROM THE HEALTHCARE SERVICE PROVIDER OPERATION 209.

In one embodiment, at PROVIDE THE HEALTHCARE SERVICE PROVIDER THE CAPABILITY TO ACCEPT THE PROPOSED PAYMENT SETTLEMENT OR TO DISPUTE THE PROPOSED PAYMENT SETTLEMENT OPERATION 213 if the healthcare service provider does not accept the healthcare consumers proposed settlement payment, process for providing a healthcare bill settlement system 200 enables the healthcare service provider to initiate a dispute communication/resolution process with the healthcare service consumer and/or the healthcare insurance provider.

In one embodiment, at PROVIDE THE HEALTHCARE SERVICE PROVIDER THE CAPABILITY TO ACCEPT THE PROPOSED PAYMENT SETTLEMENT OR TO DISPUTE THE PROPOSED PAYMENT SETTLEMENT OPERATION 213 if the healthcare service provider does not accept the healthcare consumers proposed settlement payment, process for providing a healthcare bill settlement system 200 the healthcare service provider the capability to use the intelligent EOB data to generate an "intelligent invoice". In one embodiment, the intelligent invoice includes, but is not limited to, any one of the following: references and/or links to the intelligent EOB data; highlights showing where the healthcare service provider feels the healthcare service consumer's proposed settlement payment is not consistent with the intelligent EOB data; links and/or text showing communications between the healthcare service provider and one or more healthcare insurance providers; references or links to subsequently submitted claims and/or follow-on intelligent EOBs; references and/or links to data representing third party explanations and/or clarifications of treatment and/or healthcare billing issues.

In one embodiment, at PROVIDE THE HEALTHCARE SERVICE PROVIDER THE CAPABILITY TO ACCEPT THE PROPOSED PAYMENT SETTLEMENT OR TO DISPUTE THE PROPOSED PAYMENT SETTLEMENT OPERATION 213 an analysis and/or review of the given healthcare service consumer's intelligent EOB data is performed by the healthcare service provider, and/or another user, and any perceived errors in the given healthcare service consumer's intelligent EOB data, and/or any areas where a more detailed explanation is desired, are identified to process for providing a healthcare bill settlement system 200.

In one embodiment, at PROVIDE THE HEALTHCARE SERVICE PROVIDER THE CAPABILITY TO ACCEPT THE PROPOSED PAYMENT SETTLEMENT OR TO DISPUTE THE PROPOSED PAYMENT SETTLEMENT OPERATION 213 an analysis is made by process for providing a healthcare bill settlement system 200, as to where any potential errors may have been made in processing the healthcare service consumer's claim and/or in calculating the healthcare service consumer's bill by either the healthcare service provider, the healthcare insurance provider, and/or the healthcare service consumer.

In one embodiment, once the healthcare service provider is given the capability to accept or decline the healthcare service consumer's settlement proposal to the healthcare service provider of PROVIDE THE HEALTHCARE SERVICE CONSUMER THE CAPABILITY TO PROPOSE A PAYMENT SETTLEMENT TO THE HEALTHCARE SERVICE PROVIDER BASED, AT LEAST IN PART, ON THE INTELLIGENT EOB OPERATION 211 at PROVIDE THE HEALTHCARE SERVICE PROVIDER THE CAPABILITY TO ACCEPT THE PROPOSED PAYMENT SETTLEMENT OR TO DISPUTE THE PROPOSED PAYMENT SETTLEMENT OPERATION 213, process flow proceeds to EXIT OPERATION 230. In one embodiment, at EXIT OPERATION 230, process for providing a healthcare bill settlement system 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing a healthcare bill settlement system 200, healthcare service consumers are no longer burdened with waiting for both an EOB from a healthcare insurance provider to arrive and an invoice from the healthcare service provider to arrive and then comparing the two documents and/or trying to reconcile often conflicting data and/or statements. In addition, process for providing a healthcare bill settlement system 200, the healthcare service providers also potentially receive faster payment, with less processing costs and do not have to waste resources taking phone calls from frustrated healthcare service consumers and trying to play the role of teacher and/or EOB code/language interpreter. In addition, using process for providing a healthcare bill settlement system 200, all data and/or communications between the three relevant parties, i.e., the healthcare service consumer, the healthcare service provider, and the healthcare insurance provider, can be collected in a single database and/or file and made available to all parties for both viewing and reference, in many cases, all before the healthcare service provider generates an invoice, and before the healthcare service provider expends any significant time processing the invoice.

Consequently, using process for providing a healthcare bill settlement system 200, the costs associated with generating invoices and collecting payments for healthcare related services and products can be greatly reduced, particularly for the healthcare service provider, and healthcare service consumers and healthcare service provider are both benefited by better, faster and more complete communication and dispute resolution.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "using", "identifying", "providing", "translating". "correlating", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus, means, or system for performing the operations described herein. This apparatus, means, or system may be specifically constructed for the required purposes, or the apparatus, means, or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of networks, are defined herein, operating over numerous topologies.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of various embodiments include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for providing a healthcare bill settlement system comprising:
    obtaining, by one or more computing processors, Explanation Of Benefits (EOB) data associated with a healthcare service consumer, the EOB data being associated with a given healthcare service item;
    using at least part of the EOB data, by the one or more computing processors, to generate data representing an intelligent EOB comprising:
        a translated description of one or more healthcare services rendered that is associated with the healthcare service item;
        a payment calculation display showing at least a portion of the costs and/or payments associated with the healthcare service item;
        and a statement of the estimated balance due by the healthcare service consumer to a healthcare service provider associated with the healthcare service item;
    providing, by the one or more computing processors, the data representing an intelligent EOB to the healthcare service consumer;
    providing, by the one or more computing processors, the healthcare service consumer with a capability to electronically communicate with the healthcare service provider associated with the healthcare service item;
    receiving, by the one or more computing processors, a payment settlement offer by the healthcare service provider from the healthcare consumer, the payment settlement offer being based, at least in part on the data representing an intelligent EOB, the payment settlement offer being a value less than the estimated balance due, the payment settlement offer being received prior to any invoice or other billing device being provided by the healthcare service provider to the healthcare consumer; and
    receiving, through the one or more computing processors, by the consumer on behalf of the healthcare service provider an acceptance or rejection of the payment settlement offer.

2. The computing system implemented process for providing a healthcare bill settlement system of claim 1, wherein;
    at least part of the EOB data associated with a healthcare service consumer is obtained from at least one of the sources of EOB data selected from the group of sources of EOB data consisting of:
    EOB data from one or more healthcare insurance providers
    healthcare claims data as submitted by one or more healthcare service providers to one or more healthcare insurance providers;

data from one or more healthcare service plan administrators;
data from one or more healthcare service providers;
data from a healthcare service consumer;
data from one or more healthcare expense account program providers; and
data from one or more healthcare expense account program administrators.

3. The computing system implemented process for providing a healthcare bill settlement system of claim 1, wherein;
at least part of the EOB data associated with a healthcare service consumer includes EOB data selected from the group of healthcare service item data consisting of:
names or other contact information for specific healthcare service providers;
dates when healthcare services were provided;
types of healthcare services rendered;
healthcare service codes;
claim amounts submitted by healthcare service providers;
billing codes;
healthcare insurance provider EOB codes; and
healthcare insurance provider rules governing one or more healthcare insurance plans associated with a healthcare service consumer.

4. The computing system implemented process for providing a healthcare bill settlement system of claim 1, wherein;
at least part of the translated description of one or more healthcare services rendered that are associated with the healthcare service item is created by translating healthcare service codes into text.

5. The computing system implemented process for providing a healthcare bill settlement system of claim 4, wherein;
translating healthcare service codes into text is accomplished using a database correlating healthcare service codes to text descriptions of associated healthcare services.

6. The computing system implemented process for providing a healthcare bill settlement system of claim 4, wherein;
translating healthcare service codes into text is accomplished using one or more look up tables relating healthcare service codes to text descriptions of associated healthcare services.

7. The computing system implemented process for providing a healthcare bill settlement system of claim 1, wherein;
at least part of the translated description of one or more healthcare services rendered that are associated with the healthcare service item is created by translating EOB codes into text.

8. The computing system implemented process for providing a healthcare bill settlement system of claim 7, wherein;
translating EOB codes into text is accomplished using a database correlating EOB codes to text descriptions of associated healthcare services.

9. The computing system implemented process for providing a healthcare bill settlement system of claim 7, wherein;
translating EOB codes into text is accomplished using one or more look up tables relating EOB codes to text descriptions of associated healthcare services.

10. The computing system implemented process for providing a healthcare bill settlement system of claim 1, wherein;
at least part of the translated description of one or more healthcare services rendered that are associated with the healthcare service item is created by translating medical terminology into plain language text.

11. The computing system implemented process for providing a healthcare bill settlement system of claim 1, wherein;
the healthcare service consumer is provided with the data representing an intelligent EOB using a network of computing systems.

12. The computing system implemented process for providing a healthcare bill settlement system of claim 1, wherein;
the healthcare service consumer is provided with the data representing an intelligent EOB using a website.

13. The computing system implemented process for providing a healthcare bill settlement system of claim 1, wherein;
the healthcare service consumer is provided with the data representing an intelligent EOB through a computing system implemented data management system.

14. The computing system implemented process for providing a healthcare bill settlement system of claim 1, wherein;
the healthcare service consumer is provided with the capability to electronically communicate with the healthcare service provider associated with the healthcare service item using a network of computing systems.

15. The computing system implemented process for providing a healthcare bill settlement system of claim 1, wherein;
the healthcare service consumer is provided with the capability to electronically communicate with the healthcare service provider associated with the healthcare service item using a website.

16. The computing system implemented process for providing a healthcare bill settlement system of claim 1, wherein;
the healthcare service consumer is provided with a capability to electronically communicate with the healthcare service provider associated with the healthcare service item through a computing system implemented data management system.

17. The computing system implemented process for providing a healthcare bill settlement system of claim 1, wherein;
the healthcare service consumer is provided with the capability to make a payment settlement offer to the healthcare service provider using a network of computing systems.

18. The computing system implemented process for providing a healthcare bill settlement system of claim 1, wherein;
the healthcare service consumer is provided with the capability to make a payment settlement offer to the healthcare service provider using a website.

19. The computing system implemented process for providing a healthcare bill settlement system of claim 1, wherein;
the healthcare service consumer is provided with the capability to make a payment settlement offer to the healthcare service provider through a computing system implemented data management system.

20. The computing system implemented process for providing a healthcare bill settlement system of claim 1, wherein;
the healthcare consumer is provided the data representing an intelligent EOB before the healthcare service consumer receives an invoice from the healthcare service provider.

21. The computing system implemented process for providing a healthcare bill settlement system of claim 1, wherein;
the healthcare service consumer is provided with the capability to electronically communicate with the healthcare service provider associated with the healthcare service item before the healthcare service consumer receives an invoice from the healthcare service provider.

22. The computing system implemented process for providing a healthcare bill settlement system of claim 1, wherein;
the healthcare service consumer is provided with the capability to make a payment settlement offer to the healthcare service provider before the healthcare service consumer receives an invoice from the healthcare service provider.

23. The computing system implemented process for providing a healthcare bill settlement system of claim 1, wherein;
the healthcare service provider is provided the ability to accept or reject the payment settlement offer before the healthcare service consumer receives an invoice from the healthcare service provider.

24. A computer program product for providing a process for providing a healthcare bill settlement system comprising:
a nontransitory computer readable medium; and computer program code, encoded on the computer readable medium, comprising computer readable instructions for:
obtaining Explanation Of Benefits (EOB) data associated with a healthcare service consumer, the EOB data being associated with a given healthcare service item;
using at least part of the EOB data to generate data representing an intelligent EOB comprising:
a translated description of one or more healthcare services rendered that is associated with the healthcare service item;
a payment calculation display showing at least a portion of the costs and/or payments associated with the healthcare service item;
and a statement of the estimated balance due by the healthcare service consumer to a healthcare service provider associated with the healthcare service item;
providing the data representing an intelligent EOB to the healthcare service consumer;
providing the healthcare service consumer with a capability to electronically communicate with the healthcare service provider associated with the healthcare service item;
receiving a payment settlement offer by the healthcare service provider from the healthcare consumer, the payment settlement offer being based, at least in part on the data representing an intelligent EOB, the payment settlement offer being a value less than the estimated balance due, the payment settlement offer being received prior to any invoice or other billing device being provided by the healthcare service provider to the healthcare consumer; and
receiving by the consumer on behalf of the healthcare service provider an acceptance or rejection of the payment settlement offer.

25. The computer program product for providing a process for providing a healthcare bill settlement system of claim 24, wherein;
at least part of the EOB data associated with a healthcare service consumer is obtained from at least one of the sources of EOB data selected from the group of sources of EOB data consisting of:
EOB data from one or more healthcare insurance providers
healthcare claims data as submitted by one or more healthcare service providers to one or more healthcare insurance providers;
data from one or more healthcare service plan administrators;
data from one or more healthcare service providers;
data from a healthcare service consumer;
data from one or more healthcare expense account program providers; and
data from one or more healthcare expense account program administrators.

26. The computer program product for providing a process for providing a healthcare bill settlement system of claim 24, wherein;
at least part of the EOB data associated with a healthcare service consumer includes EOB data selected from the group of healthcare service item data consisting of:
names or other contact information for specific healthcare service providers;
dates when healthcare services were provided;
types of healthcare services rendered;
healthcare service codes;
claim amounts submitted by healthcare service providers;
billing codes;
healthcare insurance provider EOB codes; and
healthcare insurance provider rules governing one or more healthcare insurance plans associated with a healthcare service consumer.

27. The computer program product for providing a process for providing a healthcare bill settlement system of claim 24, wherein;
at least part of the translated description of one or more healthcare services rendered that are associated with the healthcare service item is created by translating healthcare service codes into text.

28. The computer program product for providing a process for providing a healthcare bill settlement system of claim 27, wherein;
translating healthcare service codes into text is accomplished using a database correlating healthcare service codes to text descriptions of associated healthcare services.

29. The computer program product for providing a process for providing a healthcare bill settlement system of claim 27, wherein;
translating healthcare service codes into text is accomplished using one or more look up tables relating healthcare service codes to text descriptions of associated healthcare services.

30. The computer program product for providing a process for providing a healthcare bill settlement system of claim 24, wherein;
at least part of the translated description of one or more healthcare services rendered that are associated with the healthcare service item is created by translating EOB codes into text.

31. The computer program product for providing a process for providing a healthcare bill settlement system of claim 30, wherein;
translating EOB codes into text is accomplished using a database correlating EOB codes to text descriptions of associated healthcare services.

32. The computer program product for providing a process for providing a healthcare bill settlement system of claim 30, wherein;
translating EOB codes into text is accomplished using one or more look up tables relating EOB codes to text descriptions of associated healthcare services.

33. The computer program product for providing a process for providing a healthcare bill settlement system of claim 24, wherein;
at least part of the translated description of one or more healthcare services rendered that are associated with the healthcare service item is created by translating medical terminology into plain language text.

34. The computer program product for providing a process for providing a healthcare bill settlement system of claim 24, wherein;

the healthcare service consumer is provided with the capability to electronically communicate with the healthcare service provider associated with the healthcare service item using a network of computing systems.

35. The computer program product for providing a process for providing a healthcare bill settlement system of claim 24, wherein;
the healthcare service consumer is provided with a capability to electronically communicate with the healthcare service provider associated with the healthcare service item through a computing system implemented data management system.

36. The computer program product for providing a process for providing a healthcare bill settlement system of claim 24, wherein;
the healthcare consumer is provided the data representing an intelligent EOB before the healthcare service consumer receives an invoice from the healthcare service provider.

37. The computer program product for providing a process for providing a healthcare bill settlement system of claim 24, wherein;
the healthcare service consumer is provided with the capability to electronically communicate with the healthcare service provider associated with the healthcare service item before the healthcare service consumer receives an invoice from the healthcare service provider.

38. The computer program product for providing a process for providing a healthcare bill settlement system of claim 24, wherein;
the healthcare service consumer is provided with the capability to make a payment settlement offer to the healthcare service provider before the healthcare service consumer receives an invoice from the healthcare service provider.

39. The computer program product for providing a process for providing a healthcare bill settlement system of claim 24, wherein;
the healthcare service provider is provided the ability to accept or reject the payment settlement offer before the healthcare service consumer receives an invoice from the healthcare service provider.

\* \* \* \* \*